United States Patent
Liu et al.

(10) Patent No.: US 10,705,878 B2
(45) Date of Patent: Jul. 7, 2020

(54) TASK ALLOCATING METHOD AND SYSTEM CAPABLE OF IMPROVING COMPUTATIONAL EFFICIENCY OF A RECONFIGURABLE PROCESSING SYSTEM

(71) Applicant: Wuxi Research Institute of Applied Technologies Tsinghua University, Wuxi (CN)

(72) Inventors: Leibo Liu, Wuxi (CN); Min Zhu, Wuxi (CN); Shaojun Wei, Wuxi (CN)

(73) Assignee: Wuxi Research Institute of Applied Technologies Tsinghua University, Wuxi (CN)

( * ) Notice: Subject to any disclaimer, the term of this patent is extended or adjusted under 35 U.S.C. 154(b) by 0 days.

(21) Appl. No.: 16/130,467

(22) Filed: Sep. 13, 2018

(65) Prior Publication Data
US 2019/0087233 A1 Mar. 21, 2019

(30) Foreign Application Priority Data
Sep. 18, 2017 (CN) .......................... 2017 1 0846262

(51) Int. Cl.
*G06F 9/50* (2006.01)
*G06F 9/48* (2006.01)
*G06F 15/78* (2006.01)

(52) U.S. Cl.
CPC ............ *G06F 9/5044* (2013.01); *G06F 9/485* (2013.01); *G06F 9/4881* (2013.01); *G06F 9/505* (2013.01);
(Continued)

(58) Field of Classification Search
None
See application file for complete search history.

(56) References Cited

U.S. PATENT DOCUMENTS 6,366,582 B1 * 4/2002 Nishikado ............. H04L 49/309
370/352
6,732,354 B2 * 5/2004 Ebeling ..................... G06F 8/31
717/114
(Continued)

FOREIGN PATENT DOCUMENTS

CN 102306141 1/2012
CN 102508711 6/2012
(Continued)

OTHER PUBLICATIONS

Xiao et al. "Design and Implementation of Reconfigurable Stream Processor in Video Processing Application" China Academic Journal Electronic Publishing House, Video Engineering 32(6):18-24 (2008).
(Continued)

*Primary Examiner* — Abu Zar Ghaffari
(74) *Attorney, Agent, or Firm* — Myers Bigel, P.A.

(57) ABSTRACT

A task allocating method for a reconfigurable processing system is provided by the present disclosure. The method includes determining a use status of a hardware processing resource of the reconfigurable processing system. The hardware processing resource includes m task channels and a reconfigurable computing array, and one task channel controls at least one operator in the reconfigurable computing array at a time to process one task. The number m is a positive integer and allocating a first task in n tasks to be processed according to the use status of the hardware processing resource, so that at least one task channel in the m task channels controls the reconfigurable computing array to process simultaneously at least one task which includes the first task, where the number n is a positive integer. A task allocating system for a reconfigurable processing system is also provided by the present disclosure.

15 Claims, 4 Drawing Sheets

(52) U.S. Cl.
CPC .......... *G06F 9/5011* (2013.01); *G06F 9/5066* (2013.01); *G06F 9/4843* (2013.01); *G06F 15/7867* (2013.01)

(56) References Cited

U.S. PATENT DOCUMENTS

| | | | | |
|---|---|---|---|---|
| 7,433,909 B2* | 10/2008 | Scheuermann | ..... | G06F 15/7867 708/400 |
| 8,081,191 B2* | 12/2011 | Saleem | ............ | G06F 9/505 345/502 |
| 8,677,362 B2* | 3/2014 | Im | ................. | G06F 9/4881 712/220 |
| 9,037,834 B2* | 5/2015 | Plunkett | ........... | G06F 15/7867 712/15 |
| 9,170,812 B2* | 10/2015 | Vorbach | ........... | G06F 9/3001 |
| 9,311,270 B2* | 4/2016 | Kim | ................. | G06F 15/7885 |
| 9,424,090 B2* | 8/2016 | Sandstrom | ........... | G06F 9/5027 |
| 9,471,375 B2* | 10/2016 | Dube | .............. | G06F 9/4881 |
| 9,965,322 B2* | 5/2018 | Woo | ................ | G06F 9/5044 |
| 10,430,190 B2* | 10/2019 | Leidel | .............. | G06F 9/30145 |
| 2002/0031086 A1* | 3/2002 | Welin | .............. | G10L 25/78 370/229 |
| 2006/0053189 A1* | 3/2006 | Mantor | ............ | G06F 11/2028 708/490 |
| 2006/0179284 A1* | 8/2006 | Jensen | ............. | G06F 9/30079 712/219 |
| 2007/0101242 A1* | 5/2007 | Yancey | ............ | G06F 13/4256 714/776 |
| 2008/0320331 A1* | 12/2008 | Nakatani | ........ | G01R 31/318555 714/35 |
| 2009/0144522 A1* | 6/2009 | Vorbach | ........... | G06F 15/7867 712/15 |
| 2011/0197048 A1* | 8/2011 | Chung | ............. | G06F 9/5083 712/30 |
| 2012/0036296 A1* | 2/2012 | Wingard | ............ | G06F 12/0607 710/105 |
| 2012/0331268 A1* | 12/2012 | Konig | ............ | G06F 15/8007 712/11 |
| 2013/0268937 A1* | 10/2013 | Woo | ................ | G06F 9/5044 718/102 |
| 2015/0058857 A1* | 2/2015 | Sandstrom | ........... | G06F 9/5038 718/103 |
| 2015/0121387 A1* | 4/2015 | Chang | ............ | G06F 9/4881 718/103 |
| 2016/0036693 A1* | 2/2016 | Galdy | ............. | H04L 65/607 709/219 |
| 2016/0055612 A1* | 2/2016 | Barik | ............. | G06T 1/20 345/522 |
| 2016/0202999 A1* | 7/2016 | Van Den Heuvel | ........ | G06F 9/4411 713/100 |
| 2016/0210167 A1* | 7/2016 | Bolic | ................. | G06F 9/45558 |
| 2017/0187796 A1* | 6/2017 | Bragstad | ................ | H04L 43/16 |
| 2017/0277654 A1* | 9/2017 | Wang | ................ | G06F 9/48 |
| 2018/0196699 A1* | 7/2018 | Zhang | ................ | G09C 1/00 |
| 2019/0155850 A1* | 5/2019 | Shi | ................ | G06F 16/9024 |

FOREIGN PATENT DOCUMENTS

| CN | 104915213 | 9/2015 |
|---|---|---|
| CN | 105975048 | 9/2016 |
| CN | 106557366 | 4/2017 |

OTHER PUBLICATIONS

Notice on Granting the Patent Right for Invention corresponding to Chinese Patent Application No. 201710846262.3, dated Mar. 22, 2019 (3 pages with English translation).

First Office Action corresponding to Chinese Patent Application No. 201710846262.3, dated Jan. 11, 2019. (19 pages with English Translation).

* cited by examiner

TASK ALLOCATING METHOD AND SYSTEM CAPABLE OF IMPROVING COMPUTATIONAL EFFICIENCY OF A RECONFIGURABLE PROCESSING SYSTEM

CROSS-REFERENCE TO RELATED APPLICATION(S)

This application claims priority to a Chinese Patent Application No. 201710846262.3, filed with the Chinese Patent Office on Sep. 18, 2017 and entitled "Task allocating method and system for reconfigurable processing system", which is incorporated herein by reference entirely.

TECHNICAL FIELD

The present disclosure relates to a task allocating method and task allocating system for a reconfigurable processing system.

BACKGROUND

With the rapid development of electronic technology, reconfigurable processing systems are widely used in multimedia, communications, artificial intelligence, and data signal processing due to their superior efficiency and flexibility. As the application environment and the tasks that need to be processed become more and more complex, the requirements for the performance and efficiency of the reconfigurable processing system are also increasing. Therefore, how to improve the computational efficiency of the reconfigurable processing system has become an urgent problem to be solved.

SUMMARY

A task allocating method for a reconfigurable processing system is provided by an aspect of the present disclosure. The method comprises: determining a use status of a hardware processing resource of the reconfigurable processing system, wherein the hardware processing resource include m task channels and a reconfigurable computing array, and one task channel is capable of controlling at least one operator in the reconfigurable computing array at a time to process one task, wherein m is a positive integer; and allocating a first task in n tasks to be processed according to the use status of the hardware processing resource, so that at least one task channel in the m task channels controls the reconfigurable computing array to process simultaneously at least one task which includes the first task, wherein n is a positive integer.

Alternatively, the allocating a first task in n tasks to be processed according to the use status of the hardware processing resource comprises allocating the first task according to the use status of the hardware processing resource and a first operator resource required to process the first task.

Alternatively, the allocating the first task according to the use status of the hardware processing resource and the first operator resource required to process the first task comprises: when there is an idle task channel in the at least one task channel, and a current idle operator resource in the reconfigurable computing array matches the first operator resource, allocating the first task to the idle task channel, so that the idle task channel controls the current idle operator resource to process the first task.

Alternatively, the allocating the first task according to the use status of the hardware processing resource and the first operator resource required to process the first task comprises: when there is no idle task channel in the at least one task channel, determining a first task channel in the at least one task channel, wherein an operator resource controlled by the first task channel matches the first operator resource, or a sum of an operator resource controlled by the first task channel and a current idle operator resource in the reconfigurable computing array matches the first operator resource, and setting the first task to wait for the first task channel.

Alternatively, the determining the first task channel in the at least one task channel comprises: determining a plurality of candidate task channels in the at least one task channel, wherein an operator resource controlled by each candidate task channel of the plurality of candidate task channels matches the first operator resource, or a sum of an operator resource controlled by each candidate task channel and a current idle operator resource in the reconfigurable computing array matches the first operator resource; and selecting the first task channel from among the plurality of candidate task channels, wherein the first task channel is a task channel that is expected to be the first to be idle in the plurality of candidate task channels.

Alternatively, the n tasks to be processed respectively have different priorities, and the first task is a task with a highest priority in the n tasks to be processed.

Alternatively, the n tasks to be processed are divided into k task queues with different priorities, and the first task belongs to a first task queue with a highest priority in the k task queues, and k is a positive integer.

Alternatively, the allocating the first task according to the use status of the hardware processing resource and the first operator resource required to process the first task comprises: determining that there is an idle task channel in the at least one task channel and determining a current idle operator resource in the reconfigurable computing array; determining operator resources respectively required to process each of the n tasks to be processed; determining the first task according to the operator resources respectively required to process each of the n tasks to be processed and the current idle operator resource, wherein the first operator resource required by the first task matches the current idle operator resource; and allocating the first task to the idle task channel, so that the idle task channel controls the current idle operator resource to process the first task.

Alternatively, the determining the first task according to the operator resources respectively required to process each of the n tasks to be processed and the current idle operator resource comprises: comparing the operator resources respectively required to process each of the n tasks to be processed with the current idle operator resource; determining at least one matching task, wherein the operator resources respectively required to process each of the at least one matching task all match the current idle operator resource; and selecting a task with a highest priority in the at least one matching task as the first task according to respective priorities of the at least one matching task.

Alternatively, the operator resources may be divided according to the physical arrangement of the operators in the reconfigurable computing array.

A task allocating system for a reconfigurable processing system which includes a determining module and a task allocating module is provided by another aspect of the present disclosure. The determining module is configured to determine a use status of a hardware processing resource of the reconfigurable processing system, wherein the hardware processing resource includes m task channels and a reconfigurable computing array, one task channel is capable of controlling at least one operator resource in the reconfigurable computing array at a time to process one task, and each operator resource includes at least one operator in the reconfigurable computing array, wherein m is a positive integer. The task allocating module is configured to allocate a first task in n tasks to be processed according to the use status of the hardware processing resource, so that at least one task channel in the m task channels controls the reconfigurable computing array to process simultaneously at least one task which includes the first task, wherein n is a positive integer.

Alternatively, when allocating a first task in n tasks to be processed according to the use status of the hardware processing resource, the task allocating module is configured to allocate the first task according to the use status of the hardware processing resource and a first operator resource required to process the first task.

Alternatively, when allocating the first task according to the use status of the hardware processing resource and the first operator resource required to process the first task, the task allocating module is configured to: when there is an idle task channel in the at least one task channel, and a current idle operator resource in the reconfigurable computing array matches the first operator resource, allocate the first task to the idle task channel, so that the idle task channel controls the current idle operator resource to process the first task.

Alternatively, when allocating the first task according to the use status of the hardware processing resource and the first operator resource required to process the first task, the task allocating module is configured to: when there is no idle task channel in the at least one task channel, determine a first task channel in the at least one task channel, wherein an operator resource controlled by the first task channel matches the first operator resource, or a sum of an operator resource controlled by the first task channel and a current idle operator resource in the reconfigurable computing array matches the first operator resource, and set the first task to wait for the first task channel.

Alternatively, when determining the first task channel in the at least one task channel, the task allocating module is configured to: determine a plurality of candidate task channels in the at least one task channel, wherein an operator resource controlled by each candidate task channel of the plurality of candidate task channels matches the first operator resource, or a sum of an operator resource controlled by each candidate task channel and a current idle operator resource in the reconfigurable computing array matches the first operator resource; and select the first task channel from among the plurality of candidate task channels, wherein the first task channel is a task channel that is expected to be the first to be idle in the plurality of candidate task channels.

Alternatively, the n tasks to be processed respectively have different priorities, and the first task is a task with a highest priority in the n tasks to be processed.

Alternatively, the n tasks to be processed are divided into k task queues with different priorities, and the first task belongs to a first task queue with a highest priority in the k task queues, and k is a positive integer.

Alternatively, when allocating the first task according to the use status of the hardware processing resource and the first operator resource required to process the first task, the task allocating module is configured to: determine that there is an idle task channel in the at least one task channel and determine a current idle operator resource in the reconfigurable computing array; determine operator resources respectively required to process each of the n tasks to be processed; determine the first task according to the operator resources respectively required to process each of the n tasks to be processed and the current idle operator resource, wherein the first operator resource required by the first task matches the current idle operator resource; and allocate the first task to the idle task channel, so that the idle task channel controls the current idle operator resource to process the first task.

Alternatively, the determining the first task according to the operator resources respectively required to process each of the n tasks to be processed and the current idle operator resource comprises: comparing the operator resources respectively required to process each of the n tasks to be processed with the current idle operator resource; determining at least one matching task, wherein the operator resources respectively required to process each of the at least one matching task all match the current idle operator resource; and selecting a task with a highest priority in the at least one matching task as the first task according to respective priorities of the at least one matching task.

Alternatively, the operator resources may be divided according to the physical arrangement of the operators in the reconfigurable computing array.

Another aspect of the present disclosure provides a task allocating system for a reconfigurable processing system, comprising: one or more processors; and a storage device, configured to store one or more programs, wherein the one or more programs, when executed by the one or more processors, cause the one or more processors to implement the method described above.

Another aspect of the present disclosure provides a computer-readable medium having executable instructions stored thereon that, when executed by a processor, causes the processor to implement the method described above.

Another aspect of the present disclosure provides a computer program which includes computer-executable instructions that, when executed, are used to implement the method described above.

It can be seen that in the technical solution of the embodiment of the present disclosure, tasks to be processed are allocated according to the use status of the task channels and the reconfigurable computing array in the reconfigurable processing system, so that at least one task channel controls the different operators in the reconfigurable computing array to process simultaneously at least one task. Thus, the utilization rate of the hardware processing resource of the reconfigurable processing system may be increased, therefore the computational efficiency of the reconfigurable processing system may be improved.

BRIEF DESCRIPTION OF THE DRAWINGS

For a more complete understanding of the present disclosure and its advantages, reference is now made to the following descriptions in connection with the accompanying drawings, in which.

DETAILED DESCRIPTION

Figure 1:
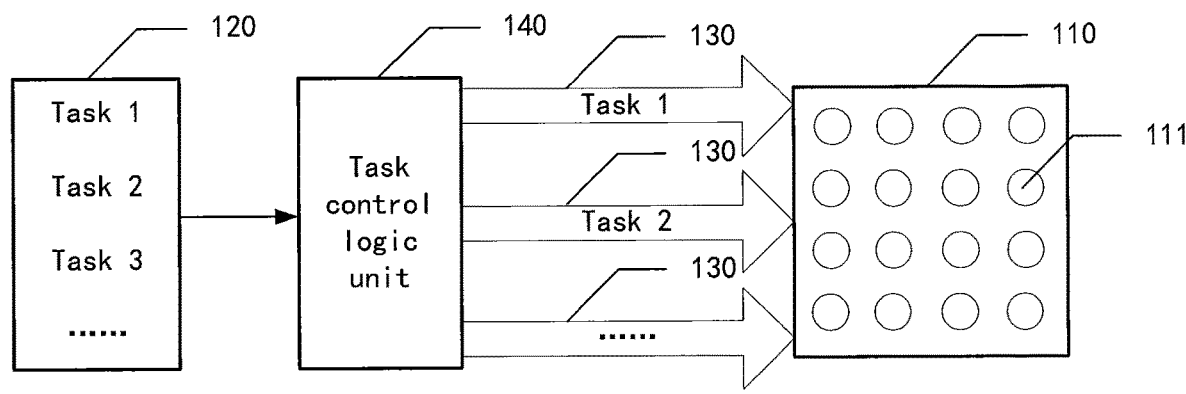
FIG. 1 schematically shows an application scenario of a task allocating method and system for a reconfigurable processing system according to an embodiment of the present disclosure.

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure.

The terminology used herein is for the purpose of describing particular embodiments only and is not intended to be limiting of the disclosure. The words "a", "an", "the", and the like, as used herein, shall also include the meaning of "a plurality" and "multiple" unless the context clearly dictates otherwise. Furthermore, the terms "include", "comprise", etc. as used herein indicate the presence of stated features, steps, operations, and/or components but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present description and should not be interpreted in an idealized or overly stereotypical manner.

In the case of a statement similar to "at least one of A, B, and C, etc.," it should be generally interpreted in the light of the ordinary understanding of the expression by a person skilled in the art (for example, "a system having at least one of A, B, and C" shall include, but is not limited to, systems with A alone, B alone, C alone, A and B, A and C, B and C, and/or A, B, C, etc.). In the case of a statement similar to "at least one of A, B, or C, etc.," it should be generally interpreted in the light of the ordinary understanding of the expression by a person skilled in the art (for example, "a system having at least one of A, B, or C" shall include, but is not limited to, systems with A alone, B alone, C alone, A and B, A and C, B and C, and/or A, B, C, etc.). It should also be understood by those skilled in the art that virtually any transitional conjunctions and/or phrases representing two or more alternative items, whether in the description, the claims or the drawings, should be understood as providing the possibilities of including one of these items, either of these items or both of these items. For example, the phrase "A or B" should be understood to include the possibilities of "A" or "B" or "A and B."

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatus such that the instructions, when executed by the processor, create means for implementing the functions/operations illustrated in these block diagrams and/or flow charts.

Accordingly, the techniques of the present disclosure may be implemented in the form of hardware and/or software (including firmware, microcode, etc.). Additionally, the techniques of the present disclosure may take the form of a computer program product on a computer readable medium having stored thereon instructions for use by or in connection with an instruction execution system. In the context of the present disclosure, a computer readable medium may be any medium that can contain, store, communicate, propagate, or transport the instructions. For example, computer readable medium can include but are not limited to electrical, magnetic, optical, electromagnetic, infrared, or semiconductor systems, apparatus, devices, or propagation medium. Specific examples of computer readable medium include a magnetic storage device such as a magnetic tape or a hard disk (HDD), an optical storage device such as a compact disc (CD-ROM), a memory such as a random access memory (RAM) or a flash memory, and/or wired/wireless communication link.

A reconfigurable processing system is a nascent processor architecture that may typically be in the form of a hardware computing array that may include a plurality of arithmetic logic units (also called operators). The arithmetic logic unit may implement various functions such as arithmetic logic. Therefore, by dynamically configuring these arithmetic logic units (for example, dynamically changing the interconnection relationship between the arithmetic logic units, etc.), the reconfigurable processing system may flexibly implement various algorithm functions, and the use of hardware operation circuit may also greatly improve computing performance.

As mentioned above, the rapid development of electronic technology has brought about higher and higher requirements for the performance and efficiency of reconfigurable processing systems. Therefore, how to increase the utilization rate of the computing resource in reconfigurable processing systems has become a problem to be solved. In view of this, the embodiments of the present disclosure provide corresponding solutions and may realize efficient operation of a reconfigurable processing system.

In particular, the embodiments of the present disclosure provide a task allocating method for a reconfigurable processing system and a system to which the method may be applied. The method comprises: determining a use status of a hardware processing resource of the reconfigurable processing system, wherein the hardware processing resource include m task channels and a reconfigurable computing array, and one task channel is capable of controlling at least one operator in the reconfigurable computing array at a time to process one task, wherein m is a positive integer; and allocating a first task in n tasks to be processed according to the use status of the hardware processing resource, so that at least one task channel in the m task channels controls the reconfigurable computing array to process simultaneously at least one task which includes the first task, wherein n is a positive integer.

It can be seen that in the technical solution of the embodiment of the present disclosure, tasks to be processed are allocated according to the use status of the task channels and the reconfigurable computing array in the reconfigurable processing system, so that at least one task channel controls the different operators in the reconfigurable computing array to process simultaneously at least one task. Thus, the utilization rate of the hardware processing resource of the reconfigurable processing system may be increased, therefore the computational efficiency of the reconfigurable processing system may be improved.

FIG. 1 schematically shows an application scenario of a task allocating method and system for a reconfigurable processing system according to an embodiment of the present disclosure.

As shown in FIG. 1, the application scenario includes a reconfigurable computing array 110, a task unit 120, at least one task channel 130, and a task control logic unit 140.

The reconfigurable computing array 110 may include a plurality of operators 111 that may implement various arithmetic and logic functions, for example, by configuring these operators 111 (for example, dynamically changing interconnection relationships between arithmetic logic units, etc.), the reconfigurable processing system may be made to process the corresponding tasks. For example, the reconfigurable computing array 110 may include a basic function unit (BFU) operator, a SBOX operator, a BENES operator, and the like. The BFU operator is mainly used to implement some data operations such as arithmetic and logic operations. The SBOX operator may implement table lookup functions. The BENES operator may implement bit replacement operations. Of course, operators for implementing other suitable functions may also be included in the reconfigurable computing array, which is not limited in the embodiments of the present disclosure.

The task unit 120 may be, for example, a storage unit of tasks to be processed for storing received task commands. For example, a bus master (not shown in FIG. 1) may send tasks to be processed into the task unit 120. The bus master may be connected to the reconfigurable processing system through a bus, and may, for example, control and schedule the reconfigurable processing system. For example, the bus master may be implemented using various general-purpose or special-purpose processors known in the art such as a Central Processing Unit (CPU). In the embodiments of the present disclosure, the tasks to be processed in the task unit may include, for example, an encryption/decryption processing task such as a task that implements a grouping algorithm, a hash algorithm, a stream cipher, and the like.

Each task channel 130 may correspond to a set of hardware timing logic. A task channel 130 may control the corresponding operators 111 to achieve a specified function according to an obtained task instruction. For example, it may configure the corresponding operators 111 (for example, configure the functions of the operators and/or configure the interconnection relationships of the operators), and may also perform timing control on the corresponding operators 111 (for example, the execution order, loop control, etc. of a plurality of operators), and the like.

The task control logic unit 140 may, for example, read a task to be processed in the task unit 110, and may also parse a task to be processed, such as parsing the task type of a task to be processed, the function to be implemented by a task, the priority of a task, and the operator resources required by the processing of a task (for example, operator types, number of operators, etc.), and the like.

The task control logic unit 140 may also obtain a use status of a hardware processing resource of the reconfigurable processing system, for example, determine a current status of each operator 111 in the reconfigurable computing array 110 (for example, whether the operator is in an operating status or an idle status, etc.) and other relevant information.

According to an embodiment of the present disclosure, the task control logic unit 140 may allocate a plurality of tasks to be processed according to the use status of the hardware processing resource, so that at least one task channel 130 may simultaneously process at least one task to be processed by controlling different operators.

For example, in the example shown in FIG. 1, the task unit 120 may include a plurality of tasks to be processed, for example, task 1, task 2, task 3, and the like. A task channel 130 may control at least one operator 111 at a time to process one task. That is, each task channel 130 processes tasks in a serial manner. The task control logic unit 140 may allocate tasks to be processed to corresponding task channels 130 according to the operator resources required by the tasks to be processed and the use status of the hardware processing resource of the reconfigurable processing system, so that at least one task channel may simultaneously process at least one task by controlling different operators.

For example, in the example in FIG. 1, it is assumed that task 1 may be allocated to a first task channel 130 and task 2 may be allocated to a second task channel 130. These two task channels may separately control different operators on the reconfigurable computing array 110 to perform tasks 1 and task 2 simultaneously.

It should be understood that for ease of illustration, a limited number of tasks, task channels, operators, etc. are shown in FIG. 1, but in the embodiments of the present disclosure, there may be other numbers of tasks, task channels, operators, etc. The embodiments of the present disclosure give no limitation hereon.

In the embodiments of the present disclosure, the use status of the hardware processing resource of the reconfigurable processing system, that is, the use status of the task channels and the reconfigurable computing array is determined, and tasks to be processed are allocated according to this information, so that at least one task channel may control the different operator resources to process simultaneously at least one task, that is, the hardware processing resource of the reconfigurable processing system may process tasks in parallel. Thus, the utilization rate of the hardware processing resource of the reconfigurable processing system may be increased, therefore the processing performance and efficiency of the reconfigurable processing system may be greatly improved.

The task allocating method according to the exemplary embodiments of the present disclosure will be described below combined with the application scenarios of FIG. 1 with reference to FIGS. 2 to 4. It should be noted that the above application scenarios are merely shown to facilitate the understanding of the spirit and principle of the present disclosure, and the embodiments of the present disclosure are not limited in this aspect. In contrast, the embodiments of the present disclosure may be applied to any applicable application scenario.

Figure 2:
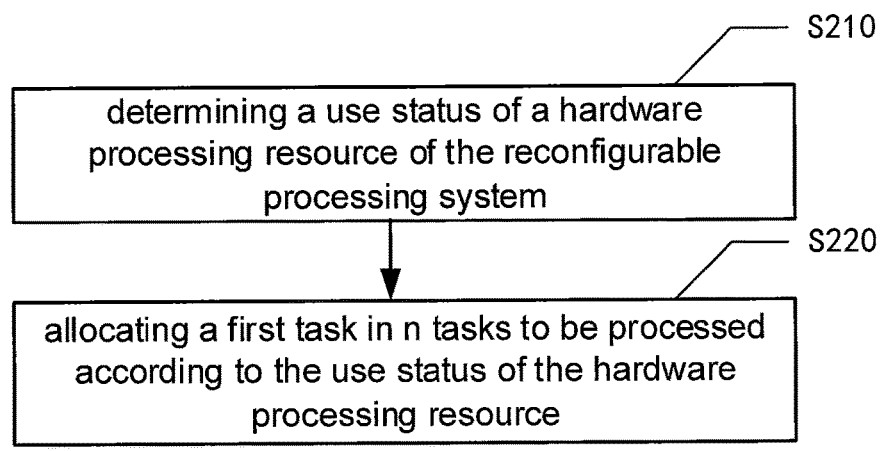
FIG. 2 schematically shows a flowchart of a task allocating method for a reconfigurable processing system according to an embodiment of the present disclosure.

FIG. 2 schematically shows a flowchart of a task allocating method for a reconfigurable processing system according to an embodiment of the present disclosure.

As shown in FIG. 2, the method includes operations S210-S220.

At operation S210, a use status of a hardware processing resource of the reconfigurable processing system is determined, wherein the hardware processing resource includes m task channels and a reconfigurable computing array, and one task channel is capable of controlling at least one operator in the reconfigurable computing array at a time to process one task, wherein m is a positive integer.

According to an embodiment of the present disclosure, the hardware processing resource of the reconfigurable processing system may include, for example, the m task channels 130 and the reconfigurable computing array 110 described with reference to FIG. 1, wherein m may be a positive integer, and preferably m may be a positive integer greater than 1, for example m may be 4. The reconfigurable computing array 110 may include, for example, a plurality of operators 111, and the plurality of operators may include, for example, BFU operators, SBOX operators, BENES operators, and the like. One task channel 130 may control at least one operator 111 at a time to process one corresponding task.

Determining the use status of the hardware processing resource of the reconfigurable processing system may be, for example, determining the use status of the m task channels, for example, determining the current status of each of the m task channels, for example, determining each task channel is currently active or idle.

Determining the use status of the hardware processing resource of the reconfigurable processing system may also include determining the use status of the reconfigurable computing array 110. For example, a single operator may be used as a resource unit in the reconfigurable computing array 110, then determining the use status of the reconfigurable computing array 110 may be determining the use status of each operator of the reconfigurable computing array 110, for example, determining each operator is currently active or idle.

In the reconfigurable computing array 110, a plurality of operators may also be used as a resource unit. For example, the operator resources may be divided according to the physical arrangement of the operators. For example, the divided resource units may be equivalent, that is, each resource unit has the same resources. For example, the operators of each row in the reconfigurable computing array 110 may be a resource unit. For example, the reconfigurable computing array 110 may have 16 rows of operators, that is, 16 resource units. Then, determining the use status of the reconfigurable computing array 110 may be determining the use status of each row of the operators in the reconfigurable computing array 110, for example, determining each row of the operators is currently active or idle. It can be understood that when a plurality of operators are used as a resource unit, the resource unit is considered to be active if there is an active operator in the resource unit.

In the reconfigurable computing array 110, a plurality of operators having the same function may also be used as a resource unit. For example, at least one operator having a basic operation function constitutes a first resource unit, at least one operator having a table lookup function constitutes a second resource unit, and at least one operator having the bit replacement function constitutes a third resource unit, and the like. In this case, determining the use status of the reconfigurable computing array 110 may be determining the use status of each resource unit of the reconfigurable computing array 110, for example, determining the number of the operators in a non-operating state in the first resource unit and their positions and the like.

At operation S220, a first task in n tasks to be processed is allocated according to the use status of the hardware processing resource, so that at least one task channel in the m task channels controls the reconfigurable computing array to process simultaneously at least one task which includes the first task, wherein n is a positive integer.

According to an embodiment of the present disclosure, the n tasks to be processed may be stored in the task unit 120 as described in FIG. 1, for example. The n tasks to be processed may be, for example, non-data processing tasks. For example, the n tasks to be processed may be tasks that indicate the reconfigurable processing system to perform operations such as reboot, self-test, or formatting. The n tasks to be processed may also be data processing tasks, for example, computation tasks such as encryption processing or decryption processing. The first task may be, for example, one of the n tasks to be processed. For example, the first task may be an encryption processing task.

Alternatively, the n tasks to be processed may have the form of a queue. That is, the n tasks to be processed may be allocated in a first-in-first-out order. In this case, the first task can be the first task in the queue. In this way, the waiting time of the task may be shortened, and the processing efficiency of the task may be improved.

In the embodiment of the present disclosure, at least one task channel in the m task channels controls the reconfigurable computing array to process simultaneously at least one task which includes the first task. This includes that a plurality of task channels of the m task channels process simultaneous a plurality of tasks which include the first task. For example, at least one of the m task channels may be processing a corresponding task before the first task is allocated. After the first task is allocated, one idle task channel of the m task channels is responsible for processing the first task, and the other task channels continue to process the tasks being processed. Alternatively, before allocating the first task, the m task channels are all in an idle state. Then, the first task is allocated to one of the m task channels, and the other task channels wait for the next task.

According to the embodiment of the present disclosure, allocating a first task in n tasks to be processed according to the use status of the hardware processing resource comprises allocating the first task according to the use status of the hardware processing resource and a first operator resource required to process the first task.

The first operator resource required to process the first task may be, for example, the number of operators, the operator types, and the like required to complete the first task.

For example, when the reconfigurable computing array is divided into resource units according to the physical arrangement of the operators, the first operator resource required to process the first task may be the number and/or function of resource units required to process the first task. For example, in the case of using the operators of each row in the reconfigurable computing array 110 as a resource unit, the first operator resource required to process the first task may refer to how many rows of operators (for example, four rows of operators); alternatively, the first operator resource required to process the first task may refer to the first row of operators, the fifth row of operators, and the eighth row of operators in the reconfigurable computing array 110.

For example, the first operator resource required to process the first task may be determined according to a configuration map of the first task. Each task may have a corresponding configuration map, which may graphically represent the resource information required to perform the task, such as the number of operators, the types of operators, the flow of data between operators, and the like.

In the embodiment of the present disclosure, when allocating the first task according to the use status of the hardware processing resource and the first operator resource required to process the first task, the first task may be allocated by the allocating method described below with reference to FIG. 3 or by the allocating method described below with reference to FIG. 4. It can be understood that, the present disclosure does not limit how to allocate the first task, as long as the use status of the hardware processing resource satisfies the condition of the operator resource required by the first task, and those skilled in the art may make adjustment to the allocating method of the first task according to the actual situation.

It can be seen that, according to the embodiments of the present disclosure, the first task is allocated according to the use status of the hardware processing resource and the first operator resource required to process the first task, thus, the utilization rate of the hardware processing resource of the reconfigurable processing system may be effectively increased, therefore the processing performance and efficiency of the reconfigurable processing system may be greatly improved.

It may be understood that, the operator resource of the reconfigurable computing array matching the operator resource required to process a task may refer to the following case: the operator resource of the reconfigurable computing array includes the operator resource required to processing the task, that is, the operator resource of the reconfigurable computing array satisfies the operator resource required to process the task. In one case, the operator resource of the reconfigurable computing array is greater than or equal to the operator resource required to process the task.

As an embodiment, a certain threshold may be set. In the case that the difference obtained by subtracting the operator resource required to process a task from the operator resource of the reconfigurable computing array is less than or equal to the certain threshold, it may be considered that the operator resource of the reconfigurable computing array matches the operator resource required to process the task. In one case, the threshold may be a natural number. In this case, the idleness or waste of operator resources may be further reduced, therefore the processing performance and efficiency of the reconfigurable processing system may be improved.

Figure 3:
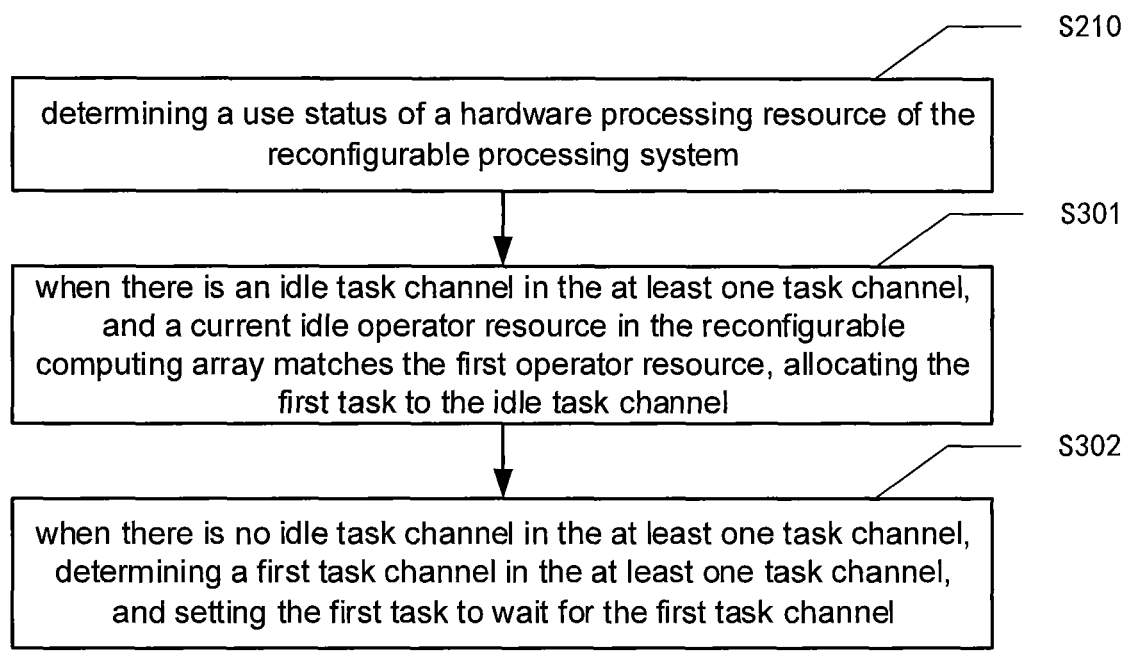
FIG. 3 schematically shows a flowchart of a method of allocating a first task according to an embodiment of the present disclosure.
Figure 4:
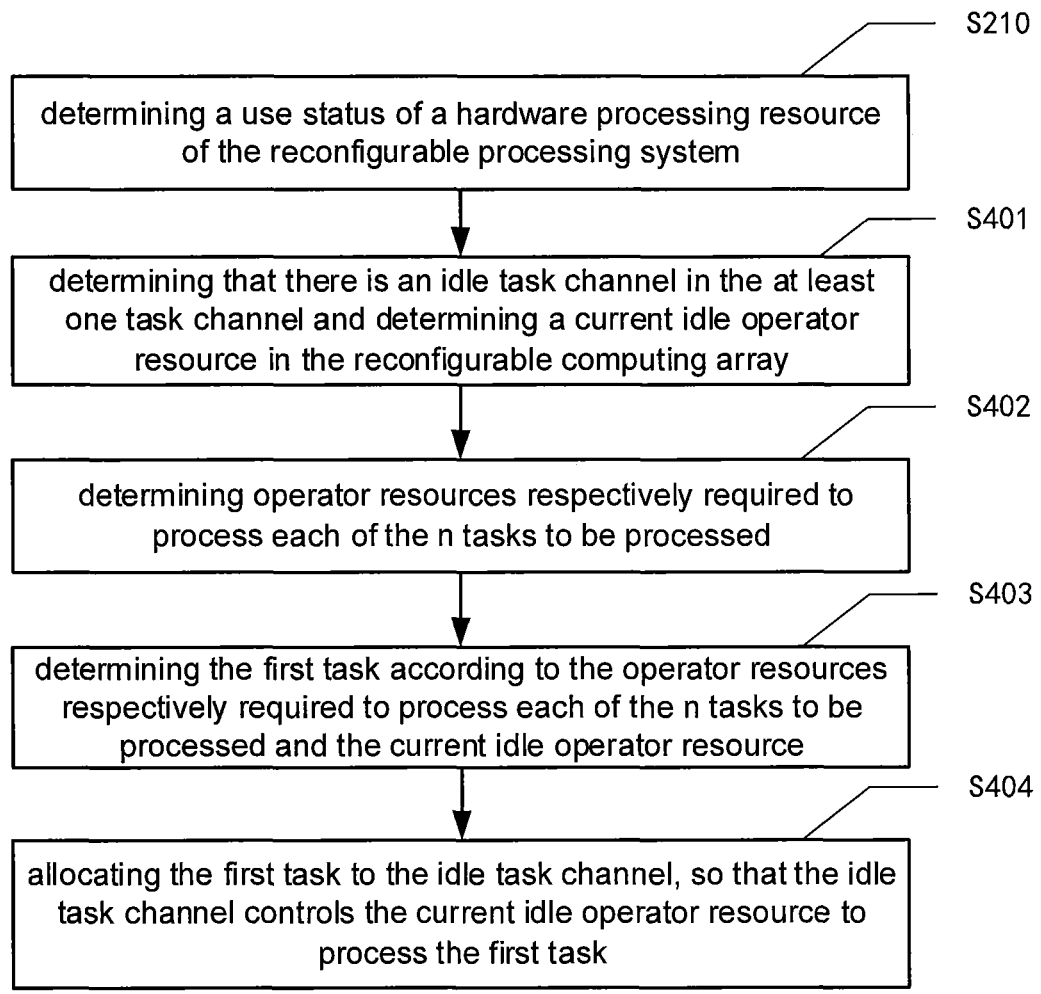
FIG. 4 schematically shows a flowchart of a method of allocating a first task according to another embodiment of the present disclosure.

With reference to FIG. 3 and FIG. 4, the method shown in FIG. 2 will be further described combined with specific embodiments.

FIG. 3 schematically shows a flowchart of a method of allocating a first task according to an embodiment of the present disclosure.

As shown in FIG. 3, the method includes operations S210, S301 to S302. The operation S210 is the same as or similar to the method described above with reference to FIG. 2, and details are not described herein again.

According to the embodiment of the present disclosure, allocating the first task according to the use status of the hardware processing resource and a first operator resource required to process the first task may include operations S301 to S302.

At operation S301, when there is an idle task channel in the at least one task channel, and a current idle operator resource in the reconfigurable computing array matches the first operator resource, the first task is allocated to the idle task channel, so that the idle task channel controls the current idle operator resource to process the first task.

According to an embodiment of the present disclosure, the first task may be determined first from the n tasks to be processed. For example, the n tasks to be processed may have different priorities respectively, and the first task may be, for example, the task having the highest priority in the n tasks to be processed. For example, the n tasks to be processed may be tasks for implementing grouping algorithms, hash algorithms, stream ciphers, sorting algorithms and the like. These tasks may be prioritized according to actual needs. For example, the priorities of the tasks for implementing the grouping algorithms may be set to the highest, followed by the hashing algorithms, the stream ciphers, and finally the sorting algorithms.

It can be seen that in this embodiment, not only the utilization rate of the hardware processing resource may be increased, but also the tasks with high priorities may be ensured to be prioritized, thereby further improving the processing performance and efficiency of the reconfigurable processing system.

Alternatively, the n tasks are divided into k task queues with different priorities. For example, task A and task B are divided into the task queue with the highest priority, task C and task D are divided into the task queue with the second highest priority, and task E is divided into the task queue with the third highest priority. Then, a task to be processed in the task queue with the highest priority may be selected as the first task. For example, the task queue may pop up the tasks according to the first-in-first-out manner, and the task that pops up first in the task queue with the highest priority may serve as the above-mentioned first task.

Here, each task queue has a corresponding priority, and it may actually be understood that each task in a task queue has the same priority, and those tasks having the same priority may be arranged in the form of a queue. Then, each task in each task queue may be allocated in a first-in-first-out order.

It can be seen that in this embodiment, not only the utilization rate of the hardware processing resource may be increased, but also the tasks in the task queue with high priority may be ensured to be prioritized, thereby further improving the processing performance and efficiency of the reconfigurable processing system.

Alternatively, the first task may be, for example, the task with the earliest reception time in the n tasks to be processed. That is, the first task may be the longest waiting task in the n tasks to be processed. As a simple and efficient implementation, n tasks to be processed may have the form of a queue. In this case, it is possible to allocate n tasks to be processed in a first-in-first-out order. The above-mentioned first task is the first task in the queue.

It can be seen that in this embodiment, by preferentially processing the task with the earliest reception time, the waiting time of the task may be reduced, and the processing performance and efficiency of the reconfigurable processing system may be further improved.

According to an embodiment of the present disclosure, after the first task is determined, a first operator resource required to process the first task is determined. Then it is determined whether there are idle task channels in the m task channels.

When there are idle task channels in the m task channels, and a current idle operator resource in the reconfigurable computing array may match the first operator resource, the first task is allocated to one of the idle task channels, so that the idle task channel may control the current idle operator resource to process the first task. The current idle operator resource in the reconfigurable computing array matching the first operator resource includes that the first operator resource required to process the first task is included in the current idle operator resource. For example, if each row of operators in the reconfigurable computing array is used as a resource unit, the current idle operator resource matching the first operator resource may mean that the number of current idle rows is greater than or equal to the number of rows required to process the first task. For another example, the current idle operator resource matching the first operator resource may mean that the number of current idle operators and their types are capable of satisfying the number of operators and operator types required to process the first task.

At operation S302, when there is no idle task channel in the at least one task channel, a first task channel in the at least one task channel is determined, wherein an operator resource controlled by the first task channel matches the first operator resource, or a sum of an operator resource controlled by the first task channel and a current idle operator resource in the reconfigurable computing array matches the first operator resource.

According to an embodiment of the present disclosure, if there are no idle task channels in the m task channels, that is, all task channels are currently processing corresponding tasks, the first task may be allocated to a corresponding first task channel, and then the first task is set to wait for the first task channel. The first task will be processed until the first task channel has finished processing its current task.

Determining a first task channel from the m task channels may be determining the operator resources currently controlled by each of the m task channels, and selecting a task channel that controls an operator resource matching the first operator resource required to process the first task as the first task channel. An operator resource controlled by a task channel matching the first operator resource required to process the first task includes that the operator resource controlled by the task channel comprises the first operator resource required to process the first task. For example, if each row of operators in the reconfigurable computing array is used as a resource unit, an operator resource controlled by a task channel matching the first operator resource may mean that the number of rows controlled by the task channel is greater than or equal to the number of rows required to process the first task. For another example, an operator resource controlled by a task channel matching the first operator resource may mean that the number of operators controlled by the task channel and their types are capable of satisfying the number of operators and operator types required to process the first task.

Alternatively, an operator resource controlled by a first task channel matching the first operator resource may mean that a difference obtained by subtracting the first operator resource from the operator resource controlled by the first task channel is less than or equal to a preset threshold. The preset threshold may be set according to actual needs. For example, if each row of operators in the reconfigurable computing array is taken as a resource unit, assuming that task channel 1 currently controls 4 rows of operators, task channel 2 currently controls 3 rows of operators, the first operator resource required to process the first task is 1 row of operators, and the threshold is assumed to be 2 row of operators, then the first task may be allocated to task channel 2, that is, the first task may be set to wait for task channel 2, although the operator resources controlled by task channel 1 and task channel 2 are both capable of satisfying the first operator resource. It can be seen that in this way, the utilization rate of the operator resources of the reconfigurable processing system may be further improved.

Alternatively, determining a first task channel from the m task channels may be determining the operator resources currently controlled by each of the m task channels, and selecting a task channel as the first task channel, where a sum of an operator resource controlled by the selected task channel and a current idle operator resource in the reconfigurable computing array matches the first operator resource required to process the first task. A sum of an operator resource controlled by a task channel and a current idle operator resource in the reconfigurable computing array matching the first operator resource required to process the first task includes that the sum of the operator resource controlled by the task channel and the current idle operator resource in the reconfigurable computing array is greater than or equal to the first operator resource required.

Alternatively, a sum of an operator resource controlled by a first task channel and a current idle operator resource in the reconfigurable computing array matching the first operator resource required to process the first task may mean that a difference obtained by subtracting the first operator resource from the sum of the operator resource controlled by the first task channel and the current idle operator resource in the reconfigurable computing array is less than or equal to a preset threshold. The preset threshold may be set according to actual needs. For example, if each row of operators in the reconfigurable computing array is taken as a resource unit, assuming that task channel 1 currently controls 7 rows of operators, task channel 2 currently controls 1 row of operators, task channel 3 currently controls 9 row of operators, the first operator resource required to process the first task is 10 row of operators, 5 row of operators are assumed to be idle, and the threshold is assumed to be 2 row of operators, then the first task may be allocated to task channel 1, that is, the first task may be set to wait for task channel 1, although the operator resources controlled by task channel 1 and task channel 3 plus the current idle operator resource are both capable of satisfying the first operator resource. It can be seen that in this way, the utilization rate of the operator resources of the reconfigurable processing system may be further improved.

In another embodiment of the present disclosure, there are a plurality of candidate task channels that satisfy the above-mentioned conditions, that is, an operator resource controlled by each candidate task channel of the plurality of candidate task channels matches the first operator resource, or a sum of an operator resource controlled by each candidate task channel and a current idle operator resource in the reconfigurable computing array matches the first operator resource. Then, a task channel that is expected to be the first to be idle may be selected among the plurality of first task channels as the first task channel. That is, the first task channel is expected to finish the task currently processed by it first, and the first task is set to wait for the first task channel so that the first task may be processed as soon as possible. It can be seen that in this embodiment, the waiting time of the task may be reduced, so that the processing efficiency of the reconfigurable processing system may be further improved.

FIG. 4 schematically shows a flowchart of a method of allocating a first task according to another embodiment of the present disclosure.

As shown in FIG. 4, the method includes operations S210, S401 to S404. The operation S210 is the same as or similar to the method described above with reference to FIG. 2, and details are not described herein again.

According to the embodiment of the present disclosure, allocating the first task according to the use status of the hardware processing resource and a first operator resource required to process the first task may also include operations S401 to S404.

At operation S401, it is determined that there is an idle task channel in the at least one task channel, and a current idle operator resource in the reconfigurable computing array is determined.

According to an embodiment of the present disclosure, first it is determined whether there is an idle task channel in the plurality of task channels, and if not, it indicates that all task channels are processing corresponding tasks. If there is an idle task channel, it means that there is a task channel that may receive a new task.

When there is an idle task channel in the plurality of task channels, the current idle operator resource in the reconfigurable computing array is determined, for example, the number and types of current idle operators in the reconfigurable computing array resources are determined. Alternatively, the number of current idle rows in the reconfigurable computing array is determined.

At operation S402, operator resources respectively required to process each of the n tasks to be processed are determined.

At operation S403, the first task is determined according to the operator resources respectively required to process each of the n tasks to be processed and the current idle operator resource, wherein the first operator resource required by the first task matches the current idle operator resource.

In an embodiment of the present disclosure, a task to be processed that requires the operator resource closest to the current idle operator resource may be selected as the first task. For example, the difference between the current idle operator resource and the operator resource required by the first task is less than a preset threshold. The threshold may be set according to actual needs. For example, task to be processed A requires 10 operators, task to be processed B requires 50 operators, task to be processed C requires 100 operators, the current idle operator resource has 60 operators, and the threshold is assumed to be 10 operators, then task B is selected as the first task. For another example, in the case where each row of operators in the reconfigurable computing array is taken as a resource unit, assuming that task to be processed A requires 10 rows of operators, task to be processed B requires 5 rows of operators, task to be processed C requires 17 rows of operators, the current idle operator resource has 12 rows of operators, and the threshold is assumed to be 2 rows of operators, then task A may be selected as the first task. In this way, the utilization rate of operator resources may be further increased, therefore the processing performance and efficiency of the reconfigurable processing system may be improved.

In another embodiment of the present disclosure, determining the first task according to the operator resources respectively required to process each of the n tasks to be processed and the current idle operator resource may comprise: comparing the operator resources respectively required to process each of the n tasks to be processed with the current idle operator resource;

determining at least one matching task, wherein the operator resources respectively required to process each of the at least one matching task all match the current idle operator resource; and selecting a task with a highest priority in the at least one matching task as the first task according to respective priorities of the at least one matching task.

Alternatively, the at least one matching task may be those tasks to be processed among the n tasks to be processed that satisfy the following condition: the difference between the current idle operator resource and the operator resources required by the at least one matching task is less than a preset threshold. For example, the threshold may be set according to actual needs.

For example, task to be processed A requires 10 operators, task to be processed B requires 50 operators, task to be processed C requires 100 operators, task to be processed D requires 55 operators, task to be processed E requires 58 operators, the current idle operator resource has 60 operators. For example, the preset threshold may be 10 operators, and the task to be processed B, the task to be processed D, and the task to be processed E may all be matching tasks.

In this embodiment, tasks to be processed are determined in the n tasks to be processed with the condition that a difference between an operator resource required by a determined task to be processed and the current idle operator resource is less than a preset threshold, and then the first task is selected from those determined tasks. This may further avoid the waste of operator resources and improve resource utilization rate.

In the embodiment of the present disclosure, each task to be processed may have a respective priority, for example, when there are a plurality of matching tasks, the matching task with the highest priority may be selected as the first task.

At operation S404, the first task is allocated to the idle task channel, so that the idle task channel controls the current idle operator resource to process the first task.

According to the embodiment of the present disclosure, after the first task is determined among the plurality of tasks to be processed, the first task is allocated to an idle task channel so that the idle task channel controls the corresponding operator resource to process the first task.

It can be understood that, in the above step S402, the operator resources respectively required by a part of the tasks to be processed in the n tasks to be processed may also be determined. For example, the operator resources respectively required by a part of the tasks to be processed that have a high priority in the n tasks to be processed may be determined. Alternatively, the operator resources respectively required by a part of the tasks to be processed that have a long waiting time in the n tasks to be processed may be determined. Then, from this part of the tasks to be processed, the first task is selected in a manner similar to that described above.

In the embodiment of the present disclosure, according to the current idle hardware processing resource and the operator resource respectively required by each task to be processed, the task that most closely matches the current idle hardware resource among the plurality of tasks to be processed is selected as the first task, and then a task channel and an operator resource is allocated to the first task, so that the first task may be processed by the reconfigurable processing system, thereby further increasing the utilization rate of the operator resources and improving the processing performance and efficiency of the reconfigurable processing system.

Figure 5:
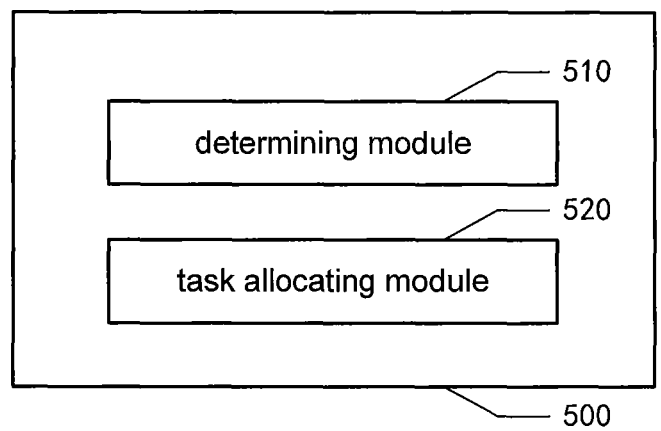
FIG. 5 is a block diagram showing modules of a task allocating system for a reconfigurable processing system according to an embodiment of the present disclosure.

FIG. 5 schematically shows a block diagram of a task allocating system 500 for a reconfigurable processing system according to an embodiment of the present disclosure.

As shown in FIG. 5, a task allocating system 500 for a reconfigurable system includes a determining module 510 and a task allocating module 520. The task allocating system 500 for the reconfigurable system may perform the method described above with reference to FIGS. 2 to 4.

Specifically, the determining module 510 may be configured to determine a use status of a hardware processing resource of the reconfigurable processing system, wherein the hardware processing resource includes m task channels and a reconfigurable computing array, and one task channel is capable of controlling at least one operator in the reconfigurable computing array at a time to process one task, wherein m is a positive integer. According to an embodiment of the present disclosure, the determining module 510 may perform, for example, operation S210 described above with reference to FIG. 2, which will not be described here again.

The task allocating module 520 may be configured to allocate a first task in n tasks to be processed according to the use status of the hardware processing resource, so that at least one task channel in the m task channels controls the reconfigurable computing array to process simultaneously at least one task which includes the first task, wherein n is a positive integer. According to an embodiment of the present disclosure, the task allocating module 520 may perform, for example, operation S220 described above with reference to FIG. 2, which will not be described here again.

When allocating a first task in n tasks to be processed according to the use status of the hardware processing resource, the task allocating module 520 may further be configured to allocate the first task according to the use status of the hardware processing resource and a first operator resource required to process the first task.

When allocating the first task according to the use status of the hardware processing resource and the first operator resource required to process the first task, the task allocating module 520 may further be configured to: when there is an idle task channel in the at least one task channel, and a current idle operator resource in the reconfigurable computing array matches the first operator resource, allocate the first task to the idle task channel, so that the idle task channel controls the current idle operator resource to process the first task. According to an embodiment of the present disclosure, the task allocating module 520 may further perform, for example, operation S301 described above with reference to FIG. 3, which will not be described here again.

When allocating the first task according to the use status of the hardware processing resource and the first operator resource required to process the first task, the task allocating module 520 may further be configured to: when there is no idle task channel in the at least one task channel, determine a first task channel in the at least one task channel, wherein an operator resource controlled by the first task channel matches the first operator resource, or a sum of an operator resource controlled by the first task channel and a current idle operator resource in the reconfigurable computing array matches the first operator resource, and set the first task to wait for the first task channel. According to an embodiment of the present disclosure, the task allocating module 520 may further perform, for example, operation S302 described above with reference to FIG. 3, which will not be described here again.

When determining a first task channel in the at least one task channel, the task allocating module 520 is further configured to: determine a plurality of candidate task channels in the at least one task channel, wherein an operator resource controlled by each candidate task channel of the plurality of candidate task channels matches the first operator resource, or a sum of an operator resource controlled by each candidate task channel and a current idle operator resource in the reconfigurable computing array matches the first operator resource; and select the first task channel from among the plurality of candidate task channels, wherein the first task channel is a task channel that is expected to be the first to be idle in the plurality of candidate task channels. According to an embodiment of the present disclosure, the task allocating module 520 may further perform, for example, operation S302 described above with reference to FIG. 3, which will not be described here again.

When allocating the first task according to the use status of the hardware processing resource and the first operator resource required to process the first task, the task allocating module 520 may further be configured to: determining that there is an idle task channel in the at least one task channel and determining a current idle operator resource in the reconfigurable computing array; determining operator resources respectively required to process each of the n tasks to be processed; determining the first task according to the operator resources respectively required to process each of the n tasks to be processed and the current idle operator resource, wherein the first operator resource required by the first task matches the current idle operator resource; and allocating the first task to the idle task channel, so that the idle task channel controls the current idle operator resource to process the first task. According to an embodiment of the present disclosure, the task allocating module 520 may further perform, for example, operations S401 to S404 described above with reference to FIG. 4, which will not be described here again.

It can be understood that the determining module 510 and the task allocating module 520 may be combined into one module, or any one of the modules may be split into a plurality of modules. Alternatively, at least some of the functionality of one or more of these modules may be combined with at least some of the functionality of the other modules and implemented in one module. According to an embodiment of the present disclosure, at least one of the determining module 510 and the task allocating module 520 may be at least partially implemented as a hardware circuit such as a field programmable gate array (FPGA), a Programmable logic array (PLA), a system-on-chip, a system on substrate, a system on package, an application specific integrated circuit (ASIC), or may be implemented in any other reasonable manner of hardware or firmware that integrates or packages the circuits, or may be implemented by software, hardware, firmware, or a combination thereof. Alternatively, at least one of the determining module 510 and the task allocating module 520 may be at least partially implemented as a computer program module that may perform the function of a corresponding module when the program is run by a computer.

For example, the determining module 510 and the task allocating module 520 may together implement the function of the task control logic unit 140 in FIG. 1.

Figure 6:
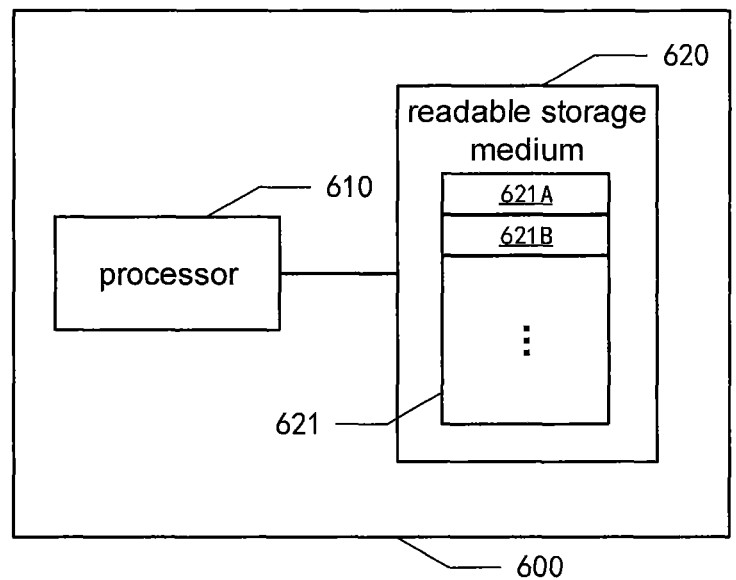
FIG. 6 schematically shows a block diagram of a task allocating system for a reconfigurable processing system according to an embodiment of the present disclosure.

FIG. 6 schematically shows a block diagram of a task allocating system for a reconfigurable processing system according to an embodiment of the present disclosure.

As shown in FIG. 6, the task allocating system 600 for a reconfigurable system includes a processor 610 and a computer-readable storage medium 620.

Specifically, the processor 610 may include, for example, general purpose microprocessors, instruction set processors and/or associated chips sets and/or special purpose microprocessors (e.g., application specific integrated circuits (ASICs)), and the like. The processor 610 may also include an on-board memory for cache usage. The processor 610 may be a single processing unit or a plurality of processing units for performing different actions of the method flow according to the embodiments of the present disclosure described with reference to FIGS. 2 to 4.

The computer-readable storage medium 620 may be any medium that can contain, store, communicate, propagate, or transport instructions. For example, readable storage medium may include but are not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Computer-readable storage medium 620 may include a computer program 621 that may include codes/computer-executable instructions that, when executed by the processor 610, cause the processor 610 to perform, for example, the method flow described above in connection with FIGS. 2 to 4 and any variations thereof.

Computer program 621 may be configured with computer program codes, including, for example, computer program modules. For example, in an example embodiment, the codes in the computer program 621 may include one or more program modules including, for example, 621A, a module 621B, etc. It should be noted that the division manner and the number of modules are not fixed, and those skilled in the art may use appropriate program modules or combination of program modules according to actual situations. When these program module combinations are executed by the processor 610, the processor 610 may perform the method flow described above in connection with FIGS. 2 to 4 and any variations thereof.

According to the embodiment of the present invention, at least one of the determining module 510 and the task allocating module 520 may be implemented as a computer program module described with reference to FIG. 5, which when executed by the processor 610 may implement the respective operations described above.

For example, the processor 610 may implement the function of the task control logic unit 140 in FIG. 1.

A person skilled in the art may understand that, the features described in the various embodiments and/or claims of the present disclosure may be combined or conjunct in various ways even if such combinations or conjunctions are not explicitly described in the present disclosure. In particular, various combinations and/or conjunctions of the features described in the various embodiments and/or claims of the present disclosure may be made without departing from the spirit and scope of the present disclosure. All such combinations and/or conjunctions are within the scope of this disclosure.

Although the present disclosure has been shown and described with reference to specific exemplary embodiments thereof, it will be understood by those skilled in the art that various changes in form and detail may be made without departing from the spirit and scope of the disclosure, as defined by the appended claims and their equivalents. Therefore, the scope of the disclosure should not be limited to the above-described embodiments, but should be determined not only by the appended claims but also by equivalents of the appended claims.

We claim:

1. A task allocating method for a reconfigurable processing system, the method comprising:
   determining a use status of a hardware processing resource of the reconfigurable processing system,
      wherein the hardware processing resource comprises m task channels and a reconfigurable computing array, m is a positive integer,
      wherein each of the m task channels comprises a set of hardware timing logic devices, and the reconfigurable computing array comprises a plurality of operators, each operator comprising a hardware processing unit configured to perform arithmetic and/or logic function,
      wherein the m task channels are configured such that at least one of the m task channels is configured to control the reconfigurable computing array to process simultaneously a plurality of tasks, with each of the at least one task channel controlling at least one operator in the reconfigurable computing array at a time to process one of the tasks, and
      wherein the use status comprises an operating status and an idle status; and
   allocating a first task in n tasks based on the use status of the hardware processing resource and based on a first operator set required for processing the first task, so that at least one of the m task channels is configured to control at least one operator in the reconfigurable computing array to process the first task, wherein n is a positive integer, and wherein the first operator set comprises one or more operators in the reconfigurable computing array,
   wherein the allocating the first task based on the use status of the hardware processing resource and based on a first operator set required for processing the first task comprises:
      when there is no idle task channel available in the at least one task channel, determining at least one candidate task channel in the at least one task channel, wherein one or more operators controlled by each of the at least one candidate task channel matches the first operator set, or a combination of the one or more operators and one or more current idle operators in the reconfigurable computing array matches the first operator set; and
      selecting one of the at least one candidate task channel for the processing of the first task.

2. The method according to claim 1, wherein the allocating the first task based on the use status of the hardware processing resource and based on a first operator set required for processing the first task comprises:
   when an idle task channel is available in the at least one task channel, and when a second operator set comprising one or more current idle operators in the reconfigurable computing array matches the first operator set, allocating the first task to the idle task channel and configuring the idle task channel to control the second operator set to process the first task.

3. The method according to claim 1, further comprising:
   setting the first task to wait for the selected candidate task channel.

4. The method according to claim 1, wherein
   the selected candidate task channel comprises a task channel that is expected to be a first to be idle in the at least one candidate task channel.

5. The method according to claim 1, wherein, the n tasks to be processed respectively have different priorities, and the first task is a task with a highest priority of the different priorities in the n tasks to be processed, or the n tasks to be processed are divided into k task queues with different queue priorities, and the first task belongs to a first task queue with a highest queue priority in the k task queues, and k is a positive integer.

6. The method according to claim 1, wherein the allocating the first task based on the use status of the hardware processing resource and based on a first operator set required for processing the first task comprises:
   determining an idle task channel is available in the at least one task channel;
   determining a second operator set comprising one or more current idle operators in the reconfigurable computing array;

determining a fifth operator set required for processing each of the n tasks;

determining the first task from the n tasks according to the determination of the fifth operator set and the determination of the second operator set, wherein the first operator set required for processing the first task matches the second operator set; and allocating the first task to the idle task channel, so that the idle task channel is configured to control the second operator set to process the first task.

7. The method according to claim 6, wherein the determining the first task according to determination of the fifth operator set and the determination of the second operator set comprises:

comparing the fifth operator set with the second operator set;

determining at least one matching task from the n tasks based on the comparing, wherein a sixth operator set required by each of the at least one matching task matches the second operator set; and selecting one of the at least one matching task with a highest priority as the first task.

8. A task allocating system for a reconfigurable processing system, the system comprising:

a memory for storing instructions; and one or more processors coupled to the memory, when the instructions stored in the memory are executed on the one or more processors, the one or more processors are configured to:

determine a use status of a hardware processing resource of the reconfigurable processing system, wherein the hardware processing resource comprises m task channels and a reconfigurable computing array, m is a positive integer, wherein each of the m task channels comprises a set of hardware timing logic devices, and the reconfigurable computing array comprises a plurality of operators, each operator comprising a hardware processing unit configured to perform arithmetic and/or logic function, wherein the m task channels are configured such that at least one of the m task channels can control the reconfigurable computing array to process simultaneously a plurality of tasks, with each of the at least one task channel controlling at least one operator in the reconfigurable computing array at a time to process one of the tasks, and wherein the use status comprises an operating status and an idle status; and allocate a first task in n tasks based on the use status of the hardware processing resource and based on a first operator set required for processing the first task, so that at least one of the m task channels is configured to control at least one operator in the reconfigurable computing array to process the first task, wherein n is a positive integer, and wherein the first operator set comprises one or more operators in the reconfigurable computing array, wherein when allocating the first task based on the use status of the hardware processing resource and based on a first operator set required for processing the first task, the one or more processors are configured to:

when there is no idle task channel available in the at least one task channel, determine at least one candidate task channel in the at least one task channel, wherein one or more operators controlled by each of the at least one candidate task channel matches the first operator set, or a combination of the one or more operators and one or more current idle operators in the reconfigurable computing array matches the first operator set; and select one of the at least one candidate task channel for the processing of the first task.

9. The system according to claim 8, wherein when allocating the first task based on the use status of the hardware processing resource and based on a first operator set required for processing the first task, the one or more processors are configured to:

when an idle task channel is available in the at least one task channel, and when a second operator set comprising one or more current idle operators in the reconfigurable computing array matches the first operator set, allocate the first task to the idle task channel and configuring that the idle task channel to control the second operator set to process the first task.

10. The system according to claim 8, wherein the one or more processors are further configured to:

set the first task to wait for the selected candidate task channel.

11. The system according to claim 8, wherein the selected candidate task channel comprises a task channel that is expected to be the first to be idle in the at least one candidate task channel.

12. The system according to claim 8, wherein, the n tasks to be processed respectively have different priorities, and the first task is a task with a highest priority of the different priorities in the n tasks to be processed, or the n tasks to be processed are divided into k task queues with different queue priorities, and the first task belongs to a first task queue with a highest queue priority in the k task queues, and k is a positive integer.

13. The system according to claim 8, wherein when allocating the first task based on the use status of the hardware processing resource and based on a first operator set required for processing the first task, the one or more processors are configured to:

determine an idle task channel is available in the at least one task channel;

determine a second operator set comprising one or more current idle operators in the reconfigurable computing array;

determine a fifth operator set required for processing each of the n tasks;

determine the first task from the n tasks according to the determination of the fifth operator set and the determination of the second operator set, wherein the first operator set required for processing the first task matches the second operator set; and allocate the first task to the idle task channel, so that the idle task channel is configured to control the second operator set to process the first task.

14. The system according to claim 13, wherein when determining the first task from the n tasks according to the determination of the fifth operator set and the determination of the second operator set, the one or more processors are configured to:

compare the fifth operator set with the second operator set;

determine at least one matching task from the n tasks based on the compare, wherein a sixth operator set required by each of the at least one matching task matches the second operator set; and select one of the at least one matching task with a highest priority as the first task.

15. A non-transitory computer readable medium having executable instructions stored thereon that, when executed by one or more processors, causes the one or more processors to:
- determine a use status of a hardware processing resource of a reconfigurable processing system,
    - wherein the hardware processing resource comprises m task channels and a reconfigurable computing array, m is a positive integer,
    - wherein each of the m task channels comprises a set of hardware timing logic devices, and the reconfigurable computing array comprises a plurality of operators, each operator comprising a hardware processing unit configured to perform arithmetic and/or logic function,
    - wherein the m task channels are configured such that at least one of the m task channels can control the reconfigurable computing array to process simultaneously a plurality of tasks, with each of the at least one task channel controlling at least one operator in the reconfigurable computing array at a time to process one of the tasks, and
    - wherein the use status comprises an operating status and an idle status; and
- allocate a first task in n tasks based on the use status of the hardware processing resource and based on a first operator set required for processing the first task, so that at least one of the m task channels is configured to control at least one operator in the reconfigurable computing array to process the first task, wherein n is a positive integer, and wherein the first operator set comprises one or more operators in the reconfigurable computing array,
- wherein when allocating the first task based on the use status of the hardware processing resource and based on a first operator set required for processing the first task, the one or more processors are configured to:
- when there is no idle task channel available in the at least one task channel, determine at least one candidate task channel in the at least one task channel, wherein one or more operators controlled by each of the at least one candidate task channel matches the first operator set, or a combination of the one or more operators and one or more current idle operators in the reconfigurable computing array matches the first operator set; and
- select one of the at least one candidate task channel for the processing of the first task.

* * * * *